(12) United States Patent
Hobohm

(10) Patent No.: US 9,085,033 B2
(45) Date of Patent: Jul. 21, 2015

(54) DRILLING TOOL

(75) Inventor: Uwe Hobohm, Wendelstein (DE)

(73) Assignee: KENNAMETAL INC., Latrobe, PA (US)

(*) Notice: Subject to any disclaimer, the term of this patent is extended or adjusted under 35 U.S.C. 154(b) by 280 days.

(21) Appl. No.: 13/392,294

(22) PCT Filed: Aug. 10, 2010

(86) PCT No.: PCT/EP2010/004876
§ 371 (c)(1),
(2), (4) Date: Mar. 1, 2012

(87) PCT Pub. No.: WO2011/023288
PCT Pub. Date: Mar. 3, 2011

(65) Prior Publication Data
US 2012/0163934 A1 Jun. 28, 2012

(30) Foreign Application Priority Data
Aug. 27, 2009 (DE) .......................... 10 2009 039 170

(51) Int. Cl.
*B23B 51/02* (2006.01)

(52) U.S. Cl.
CPC ........... *B23B 51/02* (2013.01); *B23B 2251/125* (2013.01); *B23B 2251/18* (2013.01); *B23B 2251/46* (2013.01); *Y10T 408/909* (2015.01); *Y10T 408/9095* (2015.01); *Y10T 408/9097* (2015.01)

(58) Field of Classification Search
CPC .............. B23B 51/02; B23B 2251/125; B23B 2251/18; B23B 2251/46

USPC ......... 408/211, 223, 224, 227, 230, 229, 220, 408/204, 207, 228
See application file for complete search history.

(56) References Cited

U.S. PATENT DOCUMENTS

| | | | | |
|---|---|---|---|---|
| 291,568 A | * | 1/1884 | Borchardt | 175/207 |
| 296,681 A | * | 4/1884 | Derby | 175/212 |
| 340,100 A | * | 4/1886 | Cook | 408/229 |
| 693,508 A | * | 2/1902 | Fette | 407/54 |

(Continued)

FOREIGN PATENT DOCUMENTS

| | | |
|---|---|---|
| CA | 986338 | 3/1976 |
| CN | 1953832 A | 4/2007 |

(Continued)

OTHER PUBLICATIONS

The International Bureau of WIPO, "International Preliminary Report on Patentability and Written Opinion", Mar. 6, 2012, 13 pp.

(Continued)

*Primary Examiner* — Eric A Gates
(74) *Attorney, Agent, or Firm* — Larry R. Meenan

(57) ABSTRACT

A drilling tool includes a tool shank disposed about a center longitudinal axis. The tool shank having a holding region structured to be chucked in the chuck of a machine tool and an active region extending from the holding region. The drilling tool further includes at least two partial cutting edges formed on an end face of the active region and running at right angles to the center longitudinal axis and form a drill main cutting edge and a clearance formed in the end face between the partial cutting edges. The clearance being recessed axially along the center longitudinal axis toward the tool shank.

15 Claims, 1 Drawing Sheet

(56) References Cited

U.S. PATENT DOCUMENTS

| | | | |
|---|---|---|---|
| 1,490,069 A * | 4/1924 | Gammons | 408/223 |
| 2,036,656 A * | 4/1936 | Stowell et al. | 407/32 |
| 2,412,939 A * | 12/1946 | Aston | 408/59 |
| 2,847,885 A * | 8/1958 | Wagner | 408/59 |
| 3,028,773 A * | 4/1962 | Borneman | 408/211 |
| 3,244,035 A * | 4/1966 | Jehle et al. | 408/204 |
| 3,606,565 A * | 9/1971 | Morain et al. | 408/67 |
| 3,916,582 A | 11/1975 | Costil | |
| 4,143,723 A * | 3/1979 | Schmotzer | 175/420.1 |
| 4,671,710 A * | 6/1987 | Araki | 408/145 |
| 5,056,967 A | 10/1991 | Hageman | |
| 5,653,627 A * | 8/1997 | Nishi et al. | 451/540 |
| 5,671,770 A * | 9/1997 | Rusche et al. | 137/318 |
| 5,676,501 A * | 10/1997 | Peetz et al. | 408/204 |
| 6,056,485 A * | 5/2000 | Magill et al. | 407/54 |
| 6,267,542 B1 * | 7/2001 | Salmon | 408/223 |
| 6,663,326 B1 * | 12/2003 | Hiroyasu et al. | 408/144 |
| 6,821,061 B2 * | 11/2004 | Frejd | 408/59 |
| 7,001,120 B2 * | 2/2006 | Moser et al. | 408/225 |
| 7,207,752 B2 * | 4/2007 | Schulte | 408/224 |
| 2003/0103822 A1 * | 6/2003 | Wirth et al. | 408/203.5 |
| 2006/0180355 A1 | 8/2006 | Miyanaga | |
| 2012/0121352 A1 * | 5/2012 | Ning et al. | 408/229 |

FOREIGN PATENT DOCUMENTS

| | | | | |
|---|---|---|---|---|
| DE | 11 77 904 B | 9/1964 | | |
| DE | 1177904 B | 9/1964 | | |
| DE | 23 36 886 A1 | 1/1974 | | |
| DE | 24 28 426 A1 | 1/1975 | | |
| DE | 202 11 589 U1 | 1/2004 | | |
| DE | 103 37 985 A1 | 3/2005 | | |
| EP | 0 608 084 A1 | 7/1994 | | |
| EP | 0 692 332 A1 | 1/1996 | | |
| EP | 1 396 303 A2 | 3/2004 | | |
| EP | 1 741 507 A1 | 1/2007 | | |
| EP | 1 748 859 B1 | 10/2007 | | |
| GB | 842 133 A | 7/1960 | | |
| GB | 842133 A | 7/1960 | | |
| WO | 00/41833 A1 | 7/2000 | | |
| WO | 03/035310 A1 | 5/2003 | | |
| WO | WO 2004022274 A1 * | 3/2004 | | B23G 5/18 |
| WO | 2005/118191 A1 | 12/2005 | | |

OTHER PUBLICATIONS

Jun, Liang, "Mechanist Metal Cutting," A Special Tool for Drilling Hole on a Spherical Surface, vol. 1, Jan. 31, 1992, p. 39.
Office Action dated Jun. 18, 2014 with attached China Search Report.

* cited by examiner

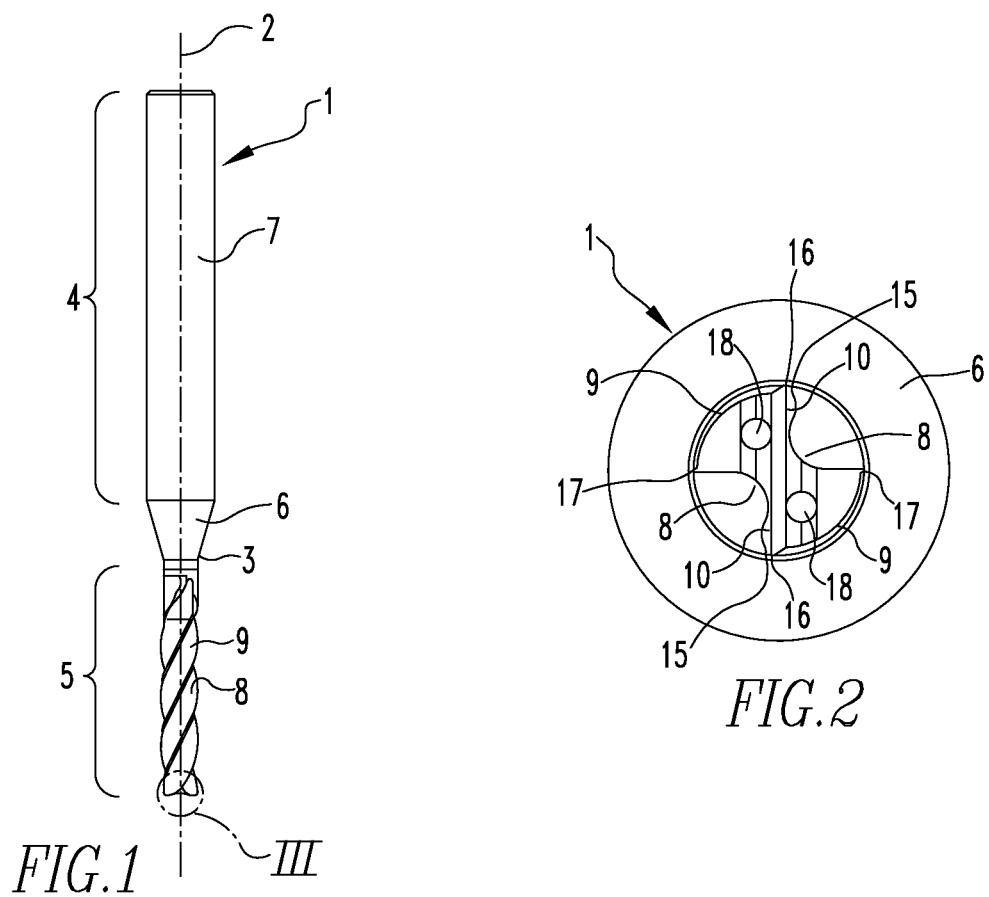
FIG.1
FIG.2
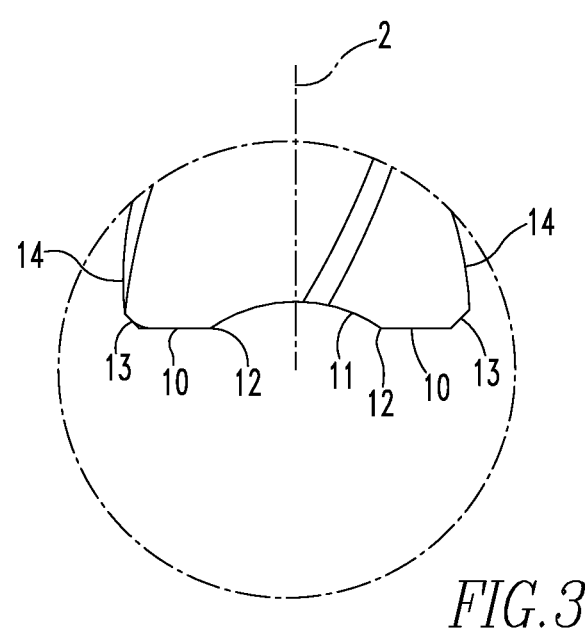
FIG.3

DRILLING TOOL

BACKGROUND OF THE INVENTION

The invention relates to a drilling tool for making holes in nonplanar surfaces, in particular cylindrical hollow bodies. When making holes in nonplanar surfaces, there is the problem that the drilling tool does not bear flush with its drill point arranged at the end face and breaks free laterally or runs untrue laterally during the drilling. This problem is exacerbated if two hollow-cylindrical elements are inserted one inside the other and the drill hole is to pass through the overlapping region of the hollow-cylindrical elements. The tool first of all penetrates through the outer wall into the wall of the outer body and leaves the latter again at its inner wall in order to immediately encounter the outer surface of the wall of the inner hollow-cylindrical part. Here, there is a great risk of the drill running untrue. This risk can even be increased by the wall thickness of the hollow-cylindrical wall not being constant per se but decreasing toward one side.

To improve the drilling behavior, it is therefore known, for example from DE-A-33 16 193, to arrange a centering point at the center of the end face of the drill, said centering point projecting from the end face. However, this centering point has the disadvantage that the cutting speed in the region of the center of the drilling tool end face is equal to zero. On account of the feed exerted on the drilling tool, there is the risk of the wall of the workpiece being squeezed, crushed or damaged.

OBJECT OF THE INVENTION

The object of the invention is therefore to design a drilling tool in such a way that it does not break free even during drilling operations on nonplanar surfaces, such that drill holes of high dimensional and geometrical accuracy can be drilled using the drilling tool.

ACHIEVEMENT OF THE OBJECT

To achieve the object, a drilling tool comprising at least two partial cutting edges which run at right angles to the center longitudinal axis of the tool shank is provided. These two partial cutting edges form the drill main cutting edge. A clearance set back in the direction of the drill shank is arranged between the partial cutting edges. The drill shank is therefore provided with a recess in the region of the center of its end face forming the drill point.

Drilling tools comprising drill main cutting edges which run at right angles to the center longitudinal axis of the tool shank are known from the prior art, for example EP-B-1 748 859. However, said drilling tools also serve to produce blind holes having a flat drill hole bottom running at right angles to the center longitudinal axis of the drill hole.

The invention is therefore based on the basic idea of not using a centering point arranged at the center of the drill end face for centering the drilling tool. On the contrary, the drilling tool according to the invention is centered via the partial cutting edges arranged at the marginal regions of the end face and via the central clearance.

The claims that refer back relate partly to advantageous developments of this invention and partly to developments of this invention that are inventive on their own.

As viewed from the margin of the end face of the tool, the partial cutting edges advantageously run first of all at right angles to the center longitudinal axis. A region of the cutting edges which runs obliquely to the center longitudinal axis adjoins this region running at right angles and thus already forms, as it were, a side wall of the clearance. In a further configuration, a noncutting central region, which forms, as it were, the clearance base, is arranged between this obliquely disposed partial cutting edge region assigned to the clearance.

It is especially advantageous to configure the transitions within the partial cutting edges in the form of radii so as to merge into one another in an especially gentle and virtually smooth manner. This is possible in an especially effective manner with a concave shaped portion in the end face of the tool as clearance.

To improve the stability of the drilling tool, the marginal region of the face is provided with a broad bevel connecting the end face with the circumferential surface. The transitions between the end face and the bevel and in turn between the bevel and the circumferential surface of the tool are also preferably configured as smooth radii. The transitions between the cutting edges and the adjacent rake faces and/or flanks are advantageously configured as radii in order to produce gentle and uniform transitions in the tool.

In a further advantageous configuration, the drilling tool has flutes shaped in its circumferential surface. In this case, those edges of the flutes which adjoin the partial cutting edges are designed as secondary cutting edges. Each secondary cutting edge preferably has a guide bevel and a supporting bevel trailing the guide bevel. These measures help considerably to improve the concentric running properties of the drilling tool and thus effectively prevent the tool from breaking away during the drilling operation.

To improve the service life of the drilling tool, the partial cutting edges of the main cutting edge and the secondary cutting edge have rounded edges. Furthermore, the surfaces of the tool, in particular the surfaces of the flutes, have to be polished. The polished flutes effectively prevent the chips to be discharged from sticking in the flutes. Alternatively or in addition to the polishing, the tool can also be completely or partly coated.

Finally, it is also possible to realize drilling tools having three- or multi-part main cutting edges. One or more coolant bores or cooling passages can also pass through the shank of the drilling tool, as required.

In particular a point grinding process according to EP-B-1 230 058 is suitable for grinding the point of the drilling tool provided with transitions configured as radii.

DESCRIPTION OF THE FIGURES

FIG. 1 shows the side view of a drilling tool according to the invention,

FIG. 2 shows a plan view of the end face of the drilling tool according to the invention, and FIG. 3 shows the drill point of the drilling tool according to circle III in FIG. 1 in an enlarged illustration.

DESCRIPTION OF THE EXEMPLARY EMBODIMENT

The drilling tool 1 consists of a tool shank 3 rotationally symmetrical to the center longitudinal axis 2 thereof. The tool shank 3 is divided in two into a tool holding region 4 of larger diameter and an active region 5 of smaller diameter. The tool holding region 4 merges into the active region 5 via the tapered transition region 6.

The tool shank 3 is of cylindrical design in the tool holding region 4 and has a smooth clamping surface 7. With its tool holding region 4, the tool shank 3 is chucked in the chuck of a machine tool. In this case, the chuck jaws of the machine tool act upon the clamping surface 7.

The active region 5 of the drilling tool 1 has a helical flute 8 and a likewise helical flute land 9. The drill point is shown in FIG. 1 in circle III and is explained in more detail with reference to the enlarged illustration in FIG. 3. In the region of the drill point, the two partial cutting edges 10 run at right angles to the center longitudinal axis 2. A trough-like concave shaped portion running in the direction of the center longitudinal axis 2 is provided between the partial cutting edges 10 as clearance 11. The partial cutting edges 10 merge smoothly into the clearance 11 via radii 12. A section of the clearance 11 is jointly active as main cutting edge during the cutting process.

A respective bevel 13 adjoins the partial cutting edges 10 at the margins. The bevel 13 forms in each case the transition from a partial cutting edge 10 of the drill end face to the circumferential surface 14 of the drilling tool 1.

Finally, the secondary cutting edges 15 assigned to the partial cutting edges 10 can be seen in FIG. 2. Each secondary cutting edge 15 has a guide bevel 16 and a trailing supporting bevel 17.

Finally, two coolant passages 18 pass through the core of the drilling tool 1 in the direction of the center longitudinal axis in such a way.

The invention claimed is:

1. A drilling tool for drilling through-holes, the drilling tool comprising:
   a tool shank disposed about a center longitudinal axis, the tool shank including a holding region having a smooth clamping surface structured to be chucked in the chuck of a machine tool and an active region extending from the holding region;
   at least two partial cutting edges formed on an end face of the active region and running at right angles to the center longitudinal axis and form a drill main cutting edge;
   a clearance formed in the end face between the partial cutting edges, the clearance being recessed axially along the center longitudinal axis toward the tool shank; and
   a plurality of helical flutes formed in a circumferential surface of the active region,
   wherein the clearance comprises a concave shaped portion, and
   wherein each partial cutting edge merges smoothly into the clearance via a radius portion.

2. The drilling tool of claim 1, wherein the clearance includes a clearance base arranged between the partial cutting edges and wherein the clearance base is not active as a cutting edge.

3. The drilling tool of claim 1, wherein the active region comprises a broad bevel formed at an end of each partial cutting edge opposite from the clearance, the broad bevel forming a transition between each partial cutting edge and a circumferential surface of the active region.

4. The drilling tool of claim 1, wherein each flute of the plurality of flutes includes a flute margin, formed as a secondary cutting edge, with a guide bevel and a supporting bevel trailing the guide bevel in the region of the secondary cutting edge.

5. The drilling tool of claim 4, wherein the partial cutting edges and the secondary cutting edges include rounded edges.

6. The drilling tool of claim 1, wherein surfaces of the drilling tool are at least one of polished or coated.

7. The drilling tool of claim 1, wherein the curved portion extends from one of the at least two partial cutting edges to another one of the at least two partial cutting edges.

8. A drilling tool for drilling through-holes, the drilling tool comprising:
   a tool shank disposed about a center longitudinal axis, the tool shank including a holding region having a smooth clamping surface structured to be chucked in the chuck of a machine tool and an active region extending from the holding region;
   at least two partial cutting edges formed on an end face of the active region and running at right angles to the center longitudinal axis and form a drill main cutting edge;
   a clearance formed in the end face between the partial cutting edges, the clearance being recessed axially along the center longitudinal axis toward the tool shank; and
   a plurality of helical flutes formed in a circumferential surface of the active region,
   wherein the clearance comprises a concave shaped portion, and
   wherein the concave shaped portion comprises a curved portion.

9. The drilling tool of claim 8, wherein the clearance includes a clearance base arranged between the partial cutting edges and wherein the clearance base is not active as a cutting edge.

10. The drilling tool of claim 8, wherein the active region comprises a broad bevel formed at an end of each partial cutting edge opposite from the clearance, the broad bevel forming a transition between each partial cutting edge and a circumferential surface of the active region.

11. The drilling tool of claim 8, wherein each flute of the plurality of flutes includes a flute margin, formed as a secondary cutting edge, with a guide bevel and a supporting bevel trailing the guide bevel in the region of the secondary cutting edge.

12. The drilling tool of claim 11, wherein the partial cutting edges and the secondary cutting edges include rounded edges.

13. The drilling tool of claim 8, wherein surfaces of the drilling tool are at least one of polished or coated.

14. The drilling tool of claim 8, wherein each partial cutting edge merges smoothly into the clearance via a radius portion.

15. The drilling tool of claim 14, wherein the curved portion extends from one of the at least two partial cutting edges to another one of the at least two partial cutting edges.

* * * * *